US011808235B2

(12) United States Patent
Gangloff, Jr. et al.

(10) Patent No.: US 11,808,235 B2
(45) Date of Patent: *Nov. 7, 2023

(54) ACOUSTIC LINER AND METHOD OF FORMING AN ACOUSTIC LINER

(71) Applicant: Rohr, Inc., Chula Vista, CA (US)

(72) Inventors: John J. Gangloff, Jr., Middletown, CT (US); Peter J. Walsh, Wethersfield, CT (US); Danielle L. Grolman, Holden, MA (US); Craig Aaron Reimann, Vernon, CT (US); Thomas P. Filburn, Granby, CT (US); Song Chiou, Irvine, CA (US); Jeong-Woo Kim, Glastonbury, CT (US); Jeffrey M. Mendoza, Manchester, CT (US)

(73) Assignee: ROHR, INC., Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,140

(22) Filed: Jul. 18, 2022

(65) Prior Publication Data

US 2022/0349363 A1 Nov. 3, 2022

Related U.S. Application Data

(63) Continuation of application No. 16/240,360, filed on Jan. 4, 2019, now Pat. No. 11,391,244.

(51) Int. Cl.
*F02K 1/82* (2006.01)
*F23M 20/00* (2014.01)
*F02C 7/045* (2006.01)
*G10K 11/168* (2006.01)

(52) U.S. Cl.
CPC .............. *F02K 1/827* (2013.01); *F02C 7/045* (2013.01); *F23M 20/005* (2015.01); *G10K 11/168* (2013.01)

(58) Field of Classification Search
CPC ....... F02K 1/827; F02C 7/045; F23M 20/005; G10K 11/168
See application file for complete search history.

(56) References Cited

U.S. PATENT DOCUMENTS

| 3,822,762 A | 7/1974 | Crispin |
| 4,235,303 A | 11/1980 | Dhoore |
| 5,594,216 A | 1/1997 | Yasukawa |

(Continued)

FOREIGN PATENT DOCUMENTS

| CN | 103915090 A | 7/2014 |
| EP | 1932659 A1 | 6/2008 |
| GB | 1490923 A | 11/1977 |

*Primary Examiner* — Forrest M Phillips
(74) *Attorney, Agent, or Firm* — GETZ BALICH LLC

(57) ABSTRACT

An acoustic liner includes a first face sheet, a second face sheet spaced from the first face sheet, and a plurality of sidewalls extending between the first face sheet and the second face sheet. The plurality of sidewalls defines a plurality of cells. Each cell of the plurality of cells defines a cavity between the first face sheet and the second face sheet. A bulk absorber is disposed within at least one cell of the plurality of cells. The bulk absorber further defines the cavity of the at least one cell of the plurality of cells. The first face sheet defines a plurality of apertures extending through a thickness of the first face sheet. Each aperture of the plurality of apertures is aligned with a respective cell of the plurality of cells.

20 Claims, 8 Drawing Sheets

(56) References Cited

U.S. PATENT DOCUMENTS

| | | | |
|---|---|---|---|
| 6,316,092 B1 * | 11/2001 | Frank | C08J 7/06 |
| | | | 428/312.2 |
| 7,040,575 B2 | 5/2006 | Struve | |
| 7,910,200 B2 | 3/2011 | Mock | |
| 8,124,189 B2 | 2/2012 | Kaiser | |
| 8,324,285 B2 | 12/2012 | Nicholas | |
| 8,336,804 B2 | 12/2012 | Hoetzeldt | |
| 8,607,929 B2 | 12/2013 | Bliton | |
| 9,003,760 B2 | 4/2015 | Chelin | |
| 9,691,371 B1 | 6/2017 | Lin | |
| 10,099,424 B2 | 10/2018 | Lin | |
| 11,391,244 B2 * | 7/2022 | Gangloff, Jr. | F02K 1/827 |
| 2009/0045009 A1 | 2/2009 | Chiou | |
| 2013/0062143 A1 * | 3/2013 | Ichihashi | G10K 11/162 |
| | | | 244/1 N |
| 2018/0030896 A1 | 2/2018 | Roach | |
| 2018/0230905 A1 * | 8/2018 | Riou | B32B 7/12 |
| 2018/0245516 A1 | 8/2018 | Howarth | |
| 2018/0304985 A1 | 10/2018 | Bullock | |
| 2019/0219000 A1 | 7/2019 | Reed | |
| 2019/0270504 A1 * | 9/2019 | Cedar | B64C 1/066 |
| 2019/0337632 A1 | 11/2019 | Berry | |
| 2020/0191091 A1 | 6/2020 | Gurvich | |

* cited by examiner

ACOUSTIC LINER AND METHOD OF FORMING AN ACOUSTIC LINER

This application is a continuation of U.S. patent application Ser. No. 16/240,360 filed Jan. 4, 2019, which is hereby incorporated herein by reference in its entirety.

BACKGROUND

1. Technical Field

This disclosure relates generally to noise attenuation structures, and more particularly to acoustic liners for aircraft gas turbine engines.

2. Background Information

A gas turbine engine may include an acoustic liner for attenuating noise generated during engine operation. These acoustic liners may generally have a sandwich structure formed by face sheets enclosing a cellular honeycomb-type inner structure. Under some circumstances, liquids encountered during engine operation, such as water, de-icer fluid, fuel, etc., may interact with the acoustic liner thereby interfering with the noise attenuating characteristics of the liner. Further, the threat of liquid interaction with acoustic liners may preclude the use of certain materials in liners which would enhance liner performance. Conventional solutions to these problems can be expensive and result in excessive acoustic liner weight and/or volume or, in some cases, can limit the frequency range of sound absorption. Accordingly, a need exists for an improved acoustic liner.

SUMMARY

According to an embodiment of the present disclosure, an acoustic liner includes a first face sheet, a second face sheet spaced from the first face sheet, and a plurality of sidewalls extending between the first face sheet and the second face sheet. The plurality of sidewalls defines a plurality of cells. Each cell of the plurality of cells defines a cavity between the first face sheet and the second face sheet. A bulk absorber is disposed within at least one cell of the plurality of cells. The bulk absorber further defines the cavity of the at least one cell of the plurality of cells. The first face sheet defines a plurality of apertures extending through ha thickness of the first face sheet. Each aperture of the plurality of apertures is aligned with a respective cell of the plurality of cells.

In the alternative or additionally thereto, in the foregoing embodiment, the acoustic liner further includes a membrane disposed proximate the first face sheet.

In the alternative or additionally thereto, in the foregoing embodiment, a portion of the membrane is free of mechanical constraint, the portion corresponding to a respective span of an adjacent aperture of the plurality of apertures.

In the alternative or additionally thereto, in the foregoing embodiment, the membrane has an areal density of 5-100 g/m$^2$.

In the alternative or additionally thereto, in the foregoing embodiment, the membrane is a non-porous membrane.

In the alternative or additionally thereto, in the foregoing embodiment, the bulk absorber is disposed adjacent the first face sheet and the cavity is further defined between the bulk absorber and the second face sheet.

In the alternative or additionally thereto, in the foregoing embodiment, the membrane includes at least one of a hydrophobic and an oleophobic material.

In the alternative or additionally thereto, in the foregoing embodiment, the membrane is disposed opposite the first face sheet with respect to the plurality of cells.

In the alternative or additionally thereto, in the foregoing embodiment, the membrane is a membrane coating disposed on a surface of the bulk absorber proximate the first face sheet.

In the alternative or additionally thereto, in the foregoing embodiment, the bulk absorber includes at least one of a hydrophobic and an oleophobic material.

In the alternative or additionally thereto, in the foregoing embodiment, the bulk absorber includes a first portion having a first porosity and a second portion having a second porosity, greater than the first porosity.

In the alternative or additionally thereto, in the foregoing embodiment, the first portion is proximate the first face sheet and the second portion is proximate the second face sheet.

In the alternative or additionally thereto, in the foregoing embodiment, the bulk absorber includes a gradated porosity extending from the first portion to the second portion.

In the alternative or additionally thereto, in the foregoing embodiment, a length of the bulk absorber is less than half of a length of the plurality of cells.

According to another embodiment of the present disclosure, a gas turbine engine includes at least one acoustic liner is disposed on an internal surface of the gas turbine engine. The at least one acoustic liner includes a first face sheet, a second face sheet spaced from the first face sheet, and a plurality of sidewalls extending between the first face sheet and the second face sheet. The plurality of sidewalls defines a plurality of cells. Each cell of the plurality of cells defines a cavity between the first face sheet and the second face sheet. A bulk absorber is disposed within at least one cell of the plurality of cells. The bulk absorber further defines the cavity of the at least one cell of the plurality of cells. The first face sheet defines a plurality of apertures extending through ha thickness of the first face sheet. Each aperture of the plurality of apertures is aligned with a respective cell of the plurality of cells.

In the alternative or additionally thereto, in the foregoing embodiment, the at least one acoustic liner further includes a membrane disposed proximate the first face sheet.

In the alternative or additionally thereto, in the foregoing embodiment, the membrane is a membrane coating disposed on a surface of the bulk absorber proximate the first face sheet.

In the alternative or additionally thereto, in the foregoing embodiment, the bulk absorber includes at least one of a hydrophobic and an oleophobic material.

According to another embodiment of the present disclosure, a method of forming an acoustic liner includes providing a base including a solid face sheet and a plurality of side walls extending from the solid face sheet. The plurality of side walls define a plurality of cells. At least one of the plurality of cells is at least partially filled with a bulk absorber.

In the alternative or additionally thereto, in the foregoing embodiment, a surface of the bulk absorber, opposite the solid face sheet, is coated with a membrane.

The present disclosure, and all its aspects, embodiments and advantages associated therewith will become more readily apparent in view of the detailed description provided below, including the accompanying drawings.

DETAILED DESCRIPTION

Figure 1:
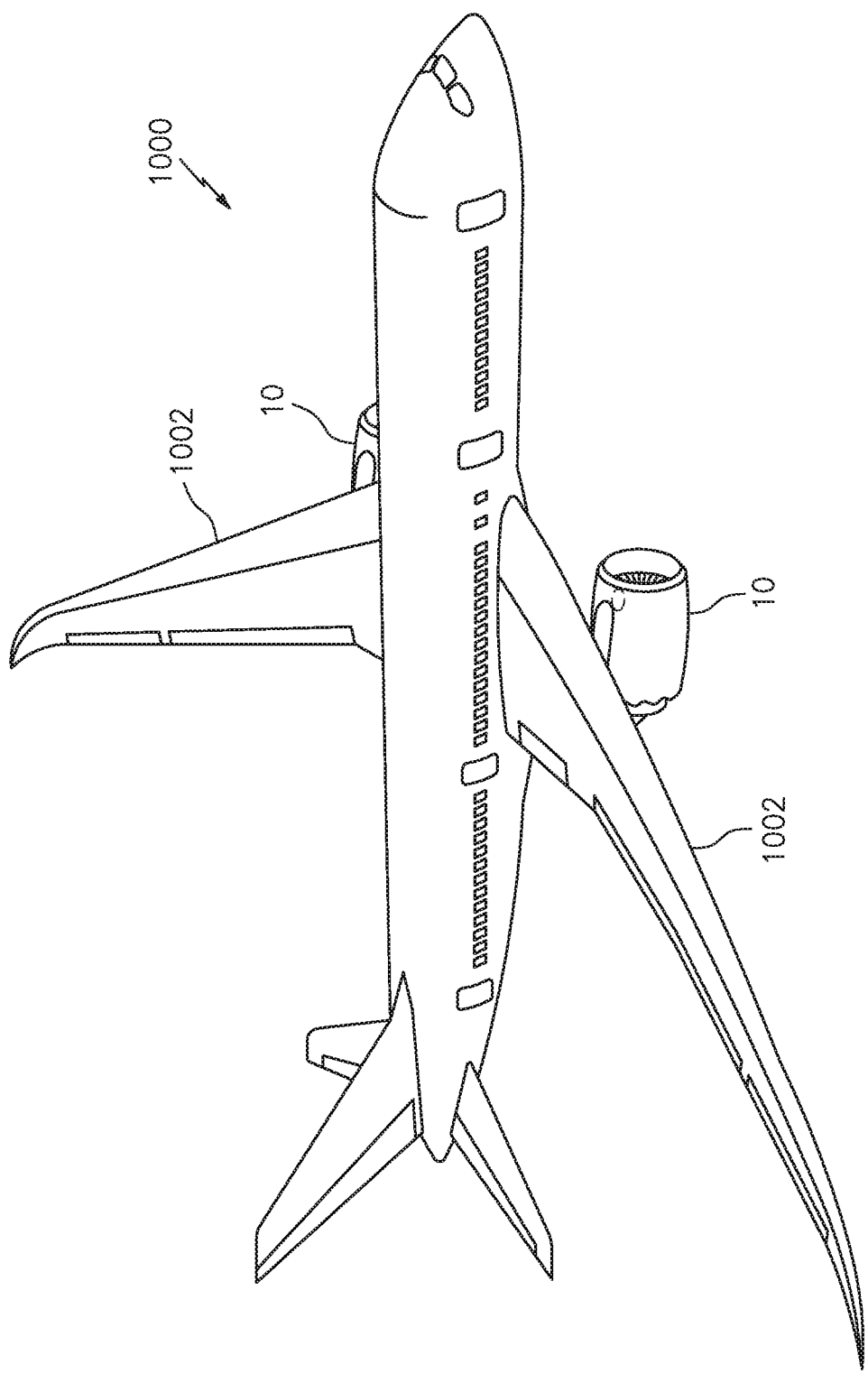
FIG. 1 is a perspective view of an aircraft.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
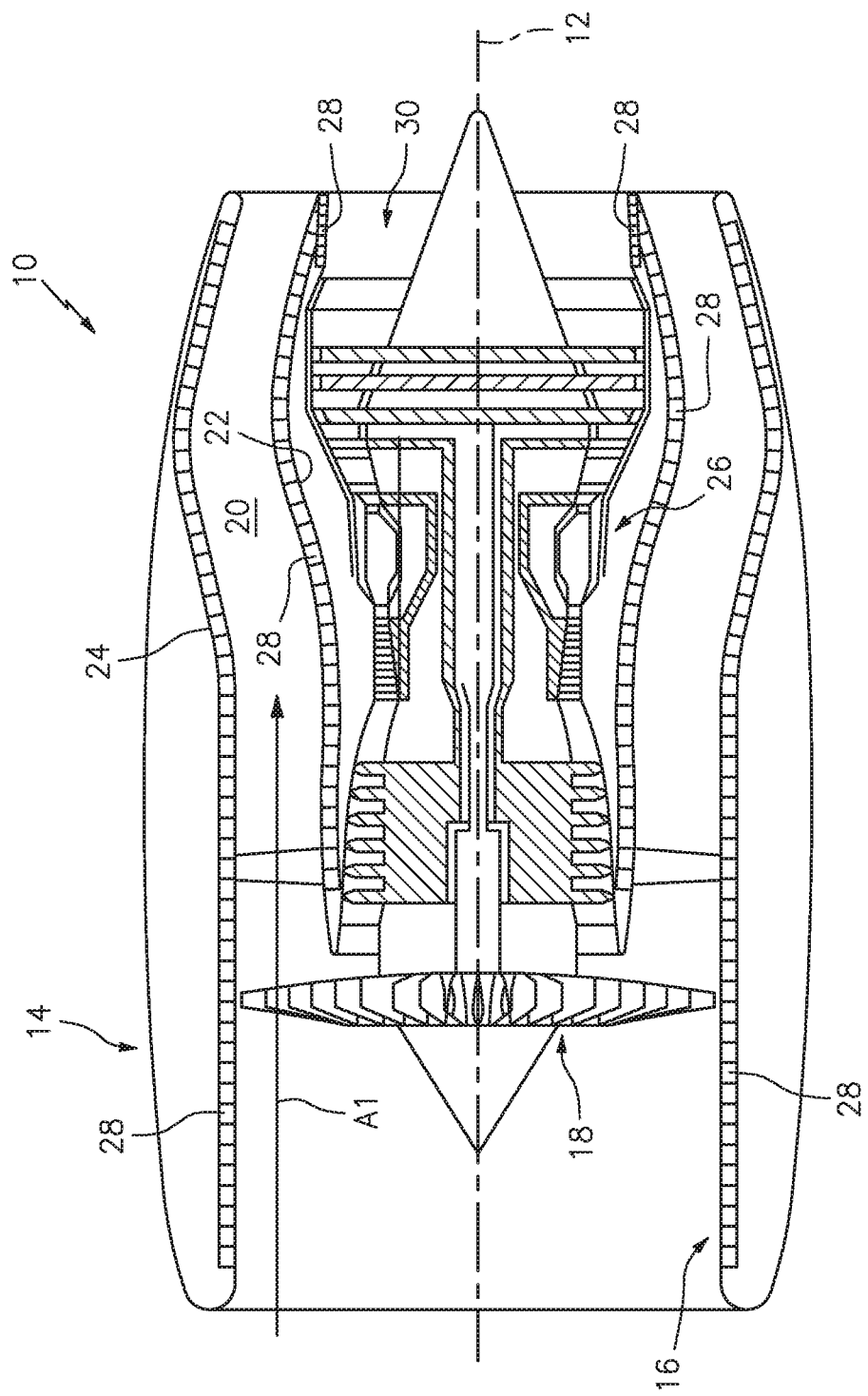
FIG. 2 is a cross-sectional, side view of a gas turbine engine.

Referring to FIGS. 1 and 2, an aircraft 1000 includes a gas turbine engine 10 mounted to, for example, a wing 1002 of the aircraft 1000. The gas turbine engine 10 is centered about a longitudinal axis 12 and includes a nacelle 14 forming an outer perimeter of the gas turbine engine 10. The nacelle 14 has an intake portion 16. A fan section 18 is disposed downstream of the intake portion 16. An annular air bypass 20 is disposed downstream of the fan section 18 and generally defined between an inner wall 22 and an outer wall 24 (e.g., an inner barrel of the nacelle 14). An engine core 26 is located radially inward of the inner wall 22. An exhaust nozzle 30 is located downstream of the engine core 26. At least a portion of air entering the intake portion 16 of the nacelle 14 (i.e., bypass flowpath A1) will pass through the fan section 18 and subsequently through the air bypass 20.

Referring to FIG. 2, an acoustic liner 28 may be carried, by an internal surface of the gas turbine engine 10, for example, a radially inward facing wall of the intake portion 16 of the nacelle 14, the inner and/or outer walls 22, 24, the exhaust nozzle 30, or other suitable surfaces of the gas turbine engine 10, to attenuate noise in the vicinity of the acoustic liner 28. It should be further understood that the present disclosure is not limited to use in gas turbine engines or aircraft and may be applied to any other vehicle, application, or environment where noise suppression, and particularly low frequency noise suppression, is desirable.

Figure 3:
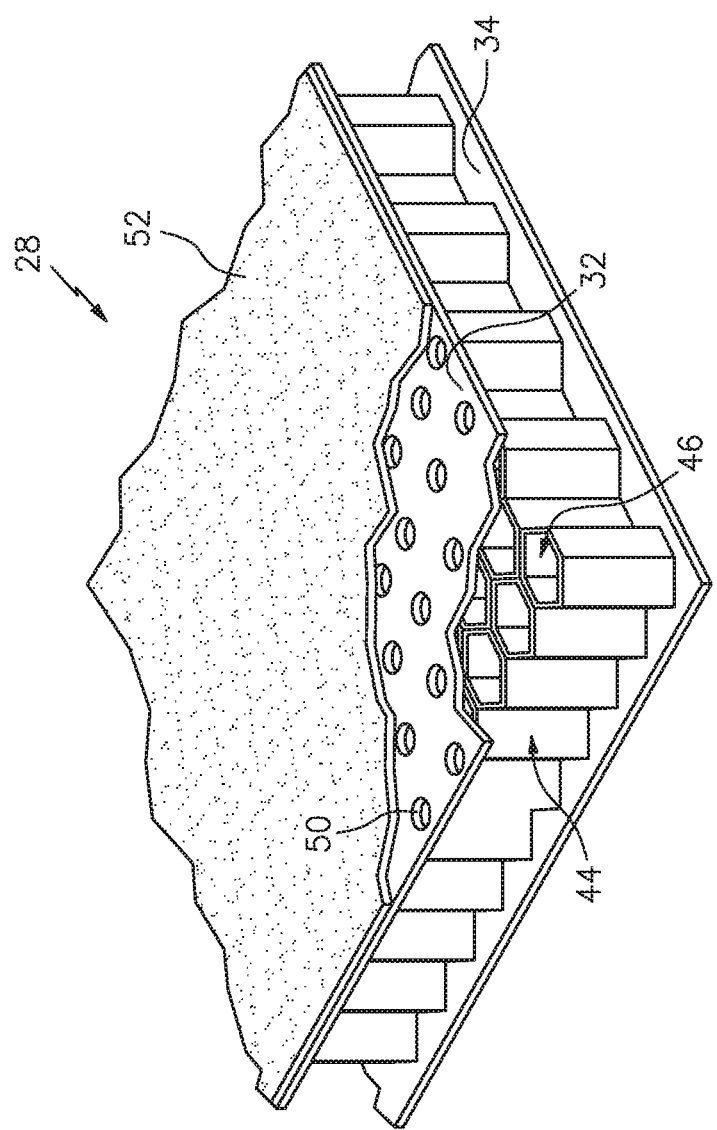
FIG. 3 is a perspective, cut-away view of an exemplary acoustic liner.
Figure 4:
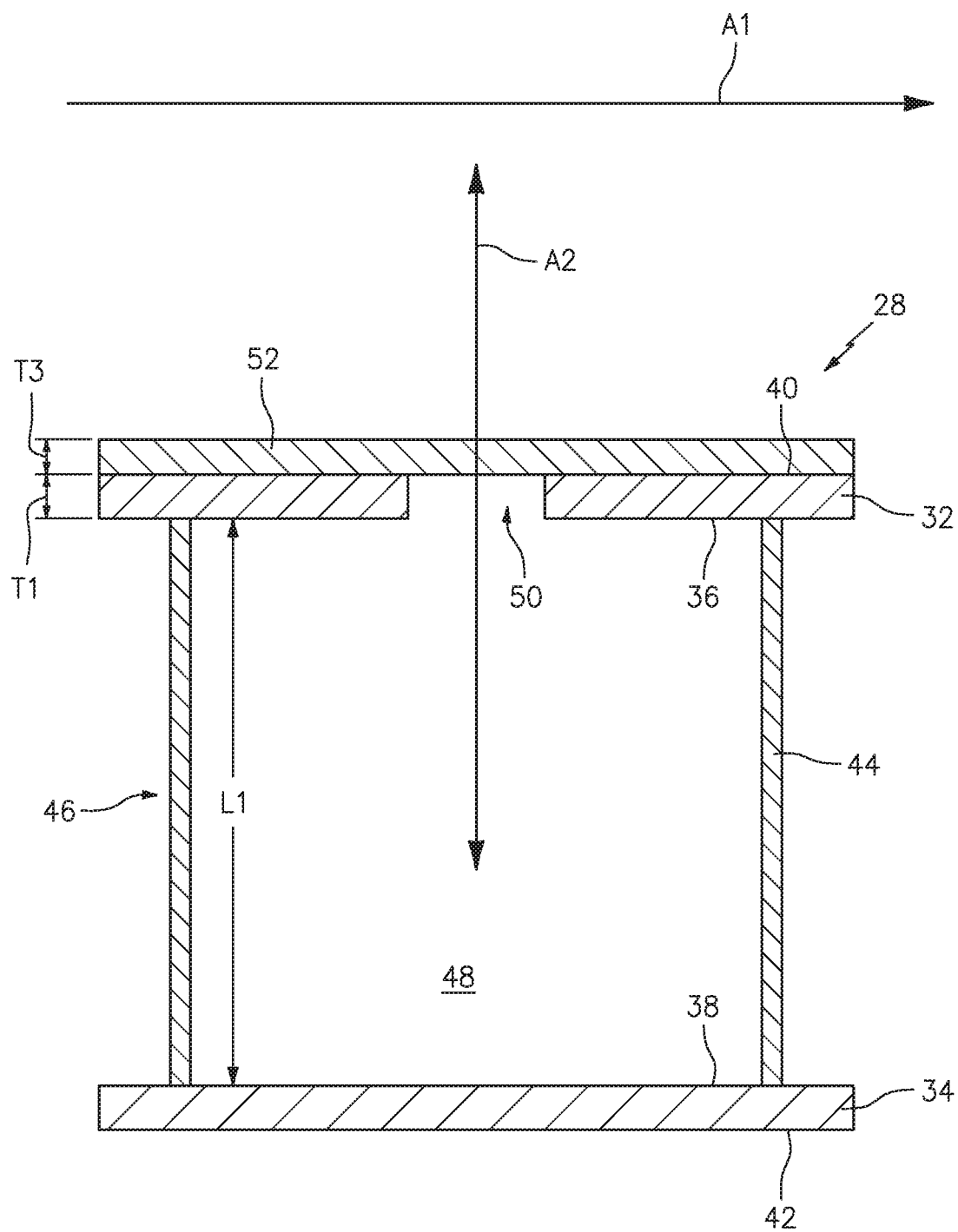
FIG. 4 is cross-sectional side view of the acoustic liner of FIG. 3.

Referring to FIGS. 3 and 4, the acoustic liner 28 may include a perforated face sheet 32 and a solid face sheet 34 spaced from the perforated face sheet 32. For example, in some embodiments, the perforated face sheet 32 and the solid face sheet 34 may be oriented substantially parallel to one another. Each of the perforated face sheet 32 and the solid face sheet 34 include an inner face 36, 38 and an outer face 40, 42, respectively. A plurality of sidewalls 44 extend between the perforated face sheet 32 and the solid face sheet 34, thereby defining a plurality of cells 46 between the perforated face sheet 32 and the solid face sheet 34. The plurality of cells 46 has a length L1. Each cell of the plurality of cells 46 defines a cavity 48 (i.e., a void). The perforated face sheet 32 defines a plurality of apertures 50 extending through a thickness T1 of the perforated face sheet 32. Each aperture of the plurality of apertures 50 is aligned with a respective cell of the plurality of cells 46.

The acoustic liner 28 may define, in part, an air passage (e.g., a passage about bypass flowpath A1) of the gas turbine engine 10, for example, the intake portion 16 of the nacelle 14, the air bypass 20, etc. Each aperture of the plurality of apertures 50 may define an air flowpath A2 between an interior and an exterior of each respective cell of the plurality of cells 46. For example, the air flowpath A2 may be defined between the bypass flowpath A1 and each respective cell of the plurality of cells 46.

As shown in FIG. 3, the plurality of cells 46 defined by the plurality of sidewalls 44 can be configured with a "honeycomb" structure defined by, for example, six walls of the plurality of sidewalls 44. However, aspects of the disclosed embodiments may be applied to cells having other configurations as well.

Still referring to FIGS. 3 and 4, in operation, for example, an airstream (e.g., bypass flowpath A1) flows across the acoustic liner 28 proximate the outer face 40 of the perforated face sheet 32 in a shearing direction. Air and/or noise from this airstream generally enters each cell of the plurality of cells 46 along the air flowpath A2 through each aperture of the plurality of apertures 50. In acoustic liners, like those described generally above, the cells of the honeycomb structure covered by the perforated face sheet 32 form resonant cavities (e.g., Helmholtz resonance chambers) that contribute to the dissipation of incident acoustic energy by attenuating acoustic reflected waves and/or converting acoustic energy into heat energy, such as by Helmholtz resonance.

The acoustic liner 28 may be made of any variety of materials depending upon a particular application including metals, composites, and ceramics. For example, if the acoustic liner 28 is applied to the exhaust nozzle 30 of the gas turbine engine 10, an acoustic liner made at least in part of ceramic may be desirable to withstand exposure to high temperatures. In some embodiments, one or both of the face sheets 32, 34 may be made from a fiber-reinforced material, a sound absorbing material, or any other suitable material. The acoustic liner 28 may be manufactured using any variety and combination of known manufacturing techniques. In some embodiments, the acoustic liner 28 may be manufactured using, at least in part, an additive manufacturing process.

The acoustic liner 28 may further include a membrane 52 disposed proximate the perforated face sheet 32 and configured to prevent entry of liquids (e.g., water, de-icer fluid, fuel, etc.) into an interior of the cells of the plurality of cells 46. For example, in some embodiments, the membrane 52 may be disposed adjacent the outer face 40 of the perforated face sheet 32. The membrane 52 has a thickness T3. In some embodiments, the membrane 52 may have a thickness T3 from approximately 10 microns to 500 microns. The membrane 52 may be a microporous membrane having, for example, a porosity of 50% or greater, an average pore size between 0.1 microns and 1.0 microns, a surface energy from approximately 15 mJ/m$^2$ (millijoules per square meter) to 25 mJ/m$^2$, and/or an areal density of 5-100 g/m$^2$ (grams per square meter). In some embodiments, the membrane 52 may be an air-permeable membrane made from at least one of an oleophobic and a hydrophobic material, including, but not limited to a fibrous non-woven material, a woven construct, or a grid pattern based on polymers or inorganic fibers such as polyethylene, terephthalate, polyamide, carbon fiber, aramid fiber, or glass fibers, or any other suitable material. The membrane 52 may also be, for example, a gel processed microporous film such as SOLUPOR 10PO5A membrane. In some other embodiments, the membrane 52 may be a thin impermeable, nonporous polymer membrane. The non-porous membrane may be made of, for example, polyether ether ketone (PEEK), polyether ketone ketone (PEKK), polyvinyl fluoride (PVF), polyvinylidene fluoride (PVDF), ethylene tetrafluoroethylene (ETFE), polysulfone (PSU) polyethylene terephthalate (PET), or any other suitable material. The membrane 52 may also be, for example, a lightweight scrim reinforced PEKK film such as LAMA-GUARD 10. In some embodiments, the membrane 52 may be coated to reduce surface energy with a thin, conformal or nearly conformal oleophobic and/or hydrophobic coating such as TEFLON AF 1601, NOVEC 2702, or any other suitable oleophobic and/or hydrophobic coating.

Figure 5A:
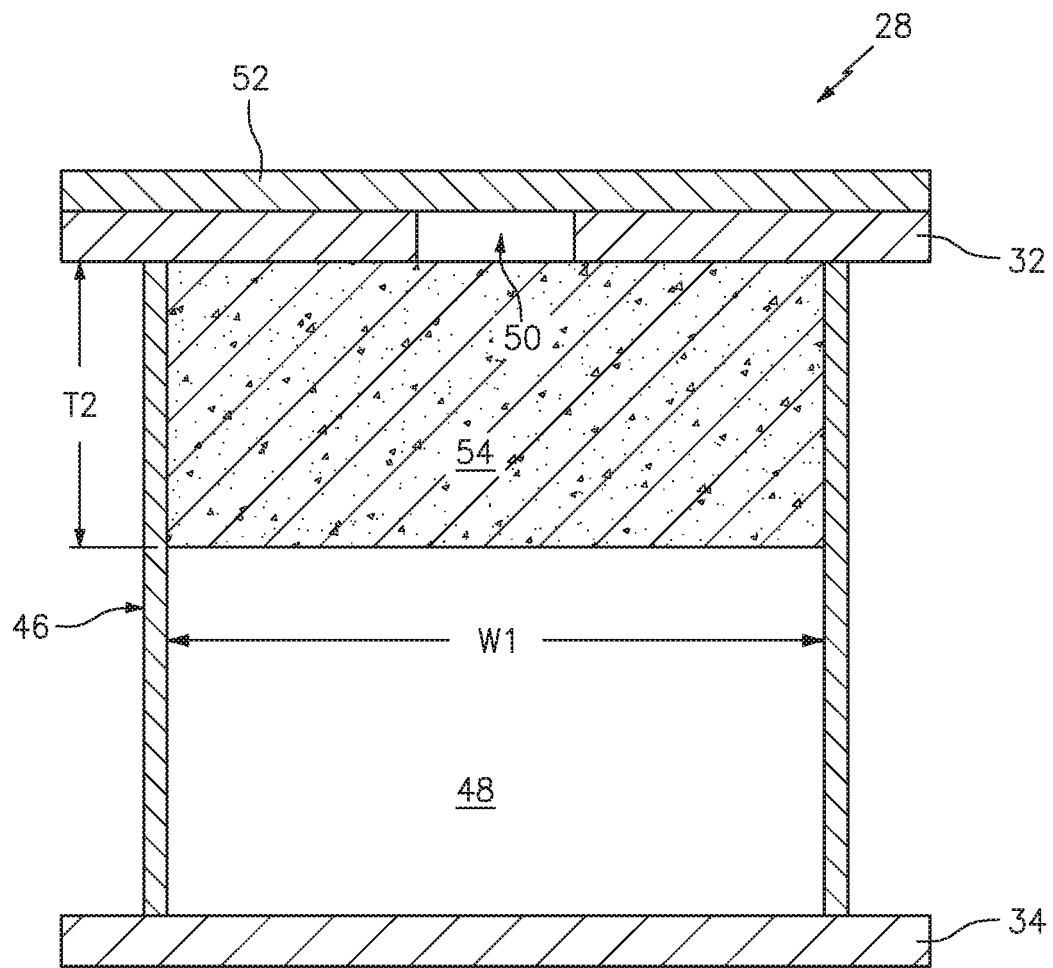
FIG. 5A is cross-sectional side view of an exemplary acoustic liner.
Figure 5B:
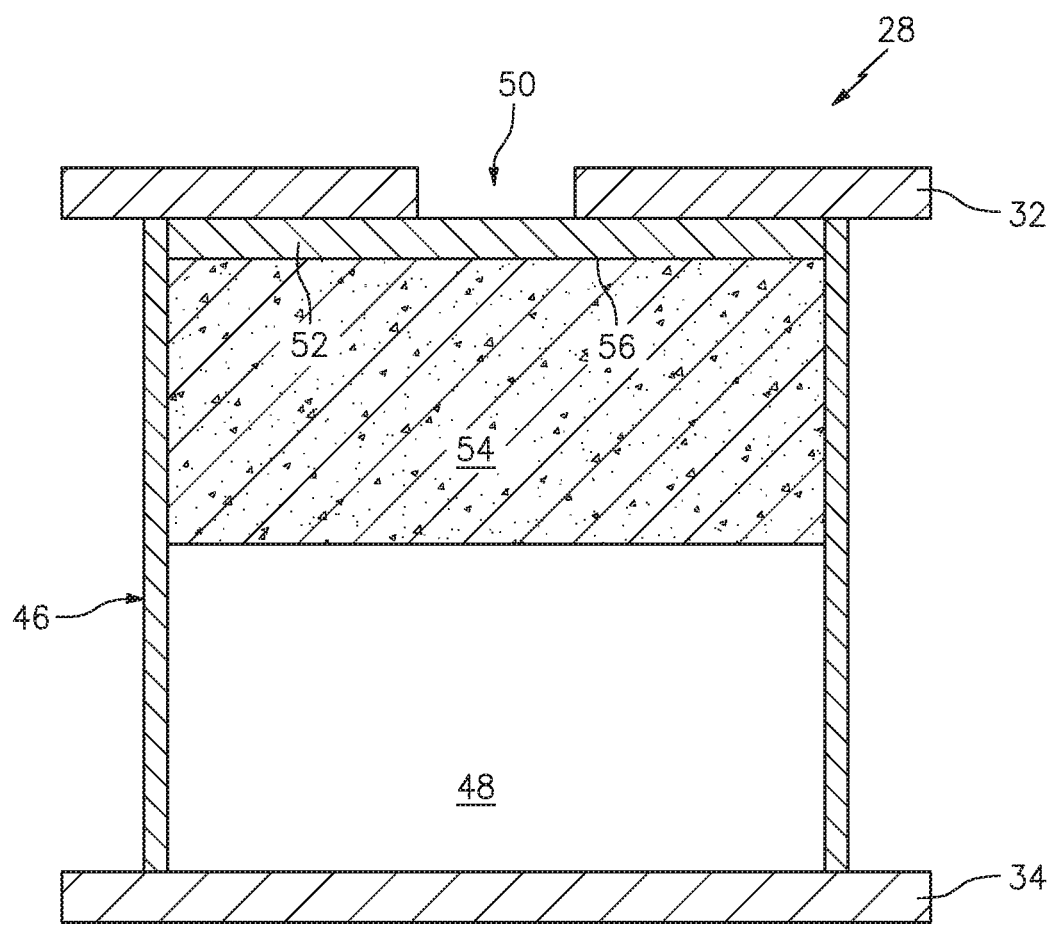
FIG. 5B is cross-sectional side view of an exemplary acoustic liner.
Figure 5C:
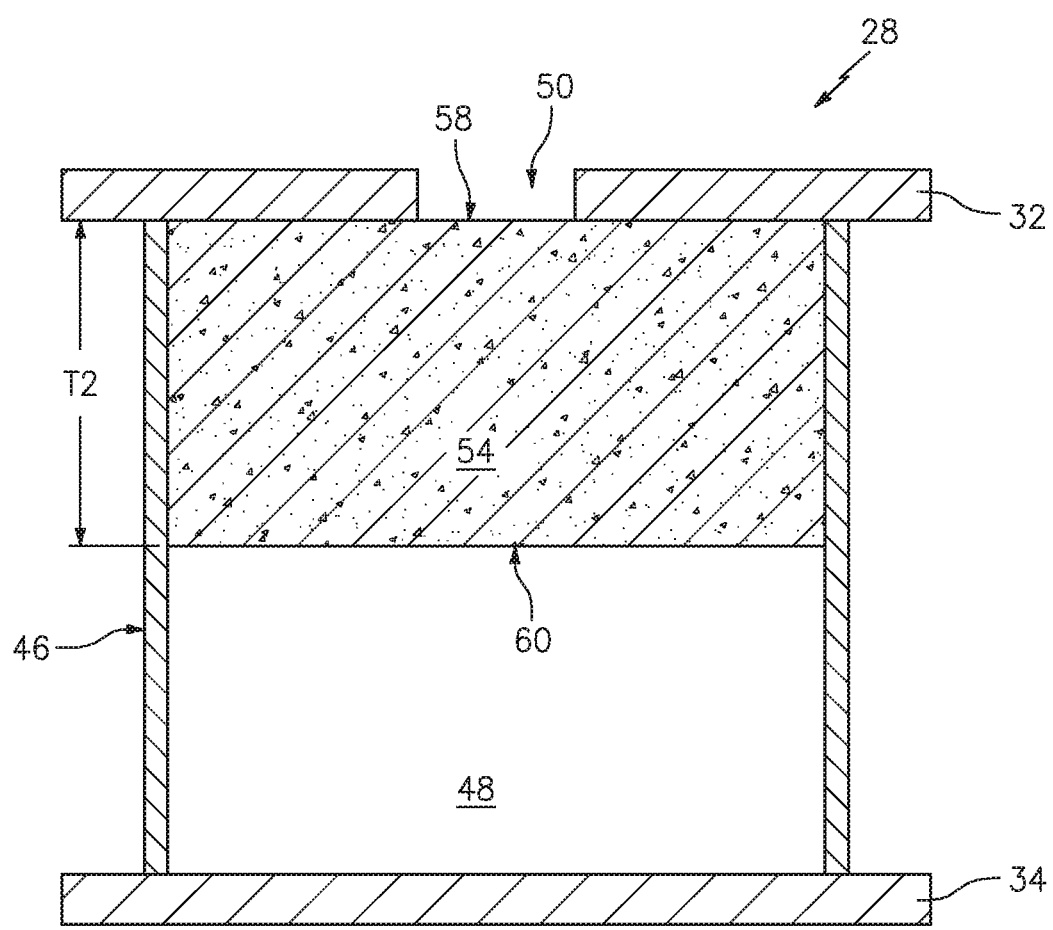
FIG. 5C is cross-sectional side view of an exemplary acoustic liner.

Referring to FIGS. 5A-5C, the acoustic liner 28 may include a bulk absorber 54, such as but not limited to an open cell foam, a closed cell foam, and/or a fibrous batting, disposed within at least a portion of at least one cell of the plurality of cells 46. As used herein, open cell foam refers to a foam in which adjacent cells are connected by openings which allow for the free passage of air between adjacent cells. The bulk absorber configured as an open cell foam may be made of polyimide, melamine, aluminum, titanium, or any other suitable polymer or metal. For example, the open cell foam may be SOLIMIDE AC-530. As used herein, fibrous batting refers to an arrangement of widely spaced fibers enclosing a large volume of air. The fibrous batting may be made of, for example, alumino-borosilicate glass fiber, polyethylene terephthalate fiber, aramid fiber, carbon fiber, or any other suitable fiber material. The fibrous batting may be, for example, DBCORE.

The bulk absorber 54 may extend substantially a width W1 of the cell. The bulk absorber 54 has a thickness T2. The bulk absorber 54 may further define the cavity 48 of the at least one cell of the plurality of cells 46 (i.e., a volume bounded by the bulk absorber 54, the solid face sheet 34, and the respective cell of the plurality of cells 46). In some embodiments, the bulk absorber 54 may be disposed adjacent the perforated face sheet 32.

The acoustic energy of sound waves can be transmitted through membrane 52, for example, by the free passage of moving air through a highly-porous, low-flow-resistance membrane or by the free vibration of an unconstrained non-porous membrane. The membrane 52 and the bulk absorber 54 dissipate acoustic energy through the friction of air molecules moving through the porous material. Acoustic energy may also be dissipated to a less extent by the mechanical vibration of the membrane 52 and the bulk absorber 54. These mechanisms lead to overall sound absorption.

The membrane 52 may prevent or reduce the ingress of liquids encountered during gas turbine engine 10 operation to the cell via air flowpath A2 (see FIG. 4), and hence interaction between the liquid and the bulk absorber 54. Interaction between liquids and the bulk absorber 54 can, for example, result in blockages of the pores of the bulk absorber 54. Such blockages can reduce the acoustic attenuating capabilities of the bulk absorber 54, and accordingly the acoustic liner 28, by preventing or reducing the flow of air through the bulk absorber 54 along air flowpath A2. In some embodiments, the membrane 52 may be free of mechanical constraint on its inner and outer sides (i.e., the side facing the perforated face sheet 32 and the opposing side) along the span of an aperture of the plurality of apertures. Such a configuration of the membrane 52 may permit unconstrained vibration of the membrane 52 over the span of the aperture thereby allowing the membrane 52 to be acoustically transparent (i.e., allows transmission of the incident energy to the bulk absorber 54).

Referring to FIG. 5B, in some embodiments, the membrane 52 may be disposed on a surface 56 of the bulk absorber 54 proximate the perforated face sheet 32 (i.e., the membrane 52 may be adjacent to the perforated face sheet 32 and/or disposed on a surface of the bulk absorber 54 closest to the perforated face sheet 32). For example, the membrane 52 may be a membrane coating applied and/or adhered to the surface 56 of the bulk absorber 54 in at least one cell of the plurality of cells 46. In some embodiments, at least a portion of a length of the membrane 52 may be bounded by the at least one cell of the plurality of cells 46.

Referring to FIG. 5C, in some embodiments, the bulk absorber 54 may comprise at least one of an oleophobic and a hydrophobic material. In such an embodiment, inclusion of the membrane 52 in the acoustic liner 28 may not be necessary.

In some embodiments, the bulk absorber 54 may include a first portion 58 and a second portion 60 of the volume of the bulk absorber 54, wherein the first portion 58 of the bulk absorber 54 has a different porosity than the second portion 60 of the bulk absorber 54. For example, in some embodiments, the first portion 58 of the bulk absorber 54 may be disposed proximate the perforated face sheet 32 while the second portion 60 of the bulk absorber 54 is disposed proximate the solid face sheet 34. For further example, in some embodiments, the second portion 60 of the bulk absorber 54 may have a greater porosity than the first portion 58 of the bulk absorber 54.

In some embodiments, the bulk absorber 54 has a gradated porosity between the first portion 58 of the bulk absorber 54 and the second portion 60 of the bulk absorber 54. For example, the porosity of the bulk absorber 54 may gradually transition from the first porosity of the first portion 58 of the bulk absorber 54 to the second porosity of the second portion 60 of the bulk absorber 54 along the thickness T2 of the bulk absorber 54 between the first portion 58 and the second portion 60. In some other embodiments, the bulk absorber 54 may gradually transition from an open cell foam to a closed cell foam along the thickness T2 of the open cell foam 54.

It will be appreciated by those of ordinary skill in the art that the physical dimensions of components of the acoustic liner 28 may be altered or tuned to attenuate targeted resonating frequency bandwidths. For example, a length, width, height, and/or volume of one or more cavities 48 may be selected to attenuate a particular frequency or frequency range. In some embodiments, for example, the acoustic liner 28 may be tuned to suppress the relatively high-frequency bandwidths emitted from a turbine section of the engine core 26 or may be tuned to suppress the lower frequency bandwidths emitted from a combustor section of the engine core 26. The membrane 52 and/or bulk absorber thickness T3, T2 or material selection may permit the acoustic frequency response of the acoustic liner 28 to be tailorable to desired noise bands for absorption. For example, in some embodiments, the thickness T2 of the bulk absorber 54 may be less than half of a length L1 of the plurality of cells 46. In some other embodiments, the length of the bulk absorber 54 may be greater than half of the length of the plurality of cells 46.

Figure 6:
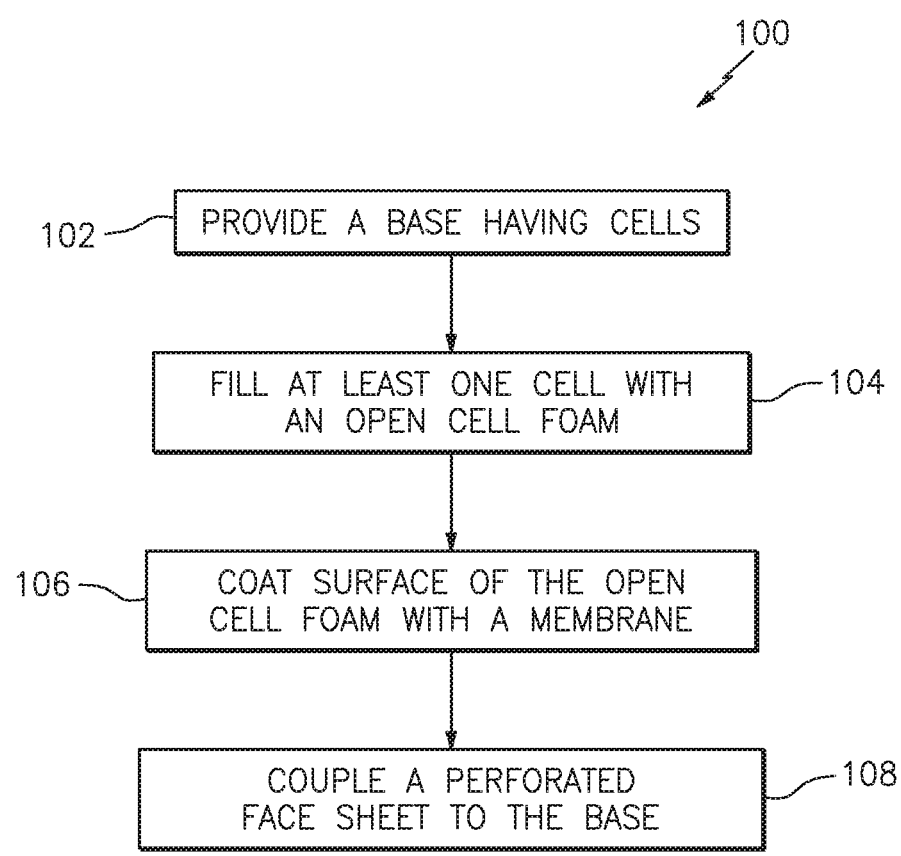
FIG. 6 illustrates a method of forming an acoustic liner.

Referring to FIG. 6, a flowchart is provided illustrating a method 100 of forming an acoustic liner. In step 102, a base can be provided. The base may include the solid face sheet 34 and the plurality of sidewalls 44 extending from the solid face sheet 34 and defining the plurality of cells 46. Each cell of the plurality of cells 46 may further define the cavity 48. In step 104, at least one cell of the plurality of cells 46 may be filled, at least partially, with the open cell foam 54. While the term "fill" or "filled" may be used, it should be understood that the open cell foam 54 may not completely fill the corresponding cell of the plurality of cells 46. In step 106, the surface 56 of the open cell foam 54, opposite the solid face sheet 34, may be coated with the membrane 52. In step 108, the perforated face sheet 32 may be coupled to the base (i.e., to the plurality of cells 46 opposite the solid face sheet 34 thereby forming a sandwiched configuration of the plurality of cells 46 between the solid face sheet 34 and the perforated face sheet 32). The plurality of apertures 50 of the perforated face sheet 32 may be aligned such that each aperture of the plurality of apertures 50 is aligned with a respective cell of the plurality of cells 46.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. An acoustic liner comprising:
   a first face sheet including an inner surface, an outer surface opposite the inner surface, and a plurality of apertures, the plurality of apertures extending through the first face sheet from the outer surface to the inner surface;
   a second face sheet spaced from the first face sheet; and
   a plurality of sidewalls mounted between the first face sheet and the second face sheet, the plurality of sidewalls forming a plurality of cells, a first cell of the plurality of cells aligned with at least one aperture of the plurality of apertures, the first cell forming and surrounding a cavity adjacent the second face sheet, the first cell including:
   a membrane including a first membrane side and a second membrane side, the first membrane side contacting the inner surface with the first membrane side located contiguous with the at least one aperture;
   a bulk absorber including a first absorber side and a second absorber side, the first absorber side contacting the second membrane side, the bulk absorber further defining the cavity between the second absorber side and the second face sheet.

2. The acoustic liner of claim 1, wherein the membrane has an areal density of 5-100 g/m$^2$.

3. The acoustic liner of claim 1, wherein the membrane is a microporous membrane.

4. The acoustic liner of claim 1, wherein the membrane includes one or both of a hydrophobic material and an oleophobic material.

5. The acoustic liner of claim 1, wherein the bulk absorber comprises a first portion having a first porosity and a second portion having a second porosity, greater than the first porosity.

6. The acoustic liner of claim 5, wherein the first portion is proximate the first face sheet and the second portion is proximate the second face sheet.

7. The acoustic liner of claim 5, wherein the bulk absorber comprises a gradated porosity extending from the first portion to the second portion.

8. The acoustic liner of claim 1, wherein a length of the bulk absorber is less than half of a length of the first cell.

9. The acoustic liner of claim 1, wherein the bulk absorber is an open cell foam.

10. The acoustic liner of claim 1, wherein the membrane is surrounded by sidewalls of the plurality of sidewalls which form the first cell.

11. A gas turbine engine comprising:
    at least one acoustic liner disposed on an internal surface of the gas turbine engine, the at least one acoustic liner comprising:
    a first face sheet including an inner surface, an outer surface opposite the inner surface, and a plurality of apertures, the plurality of apertures extending through the first face sheet from the outer surface to the inner surface;
    a second face sheet spaced from the first face sheet; and
    a plurality of sidewalls mounted between the first face sheet and the second face sheet, the plurality of sidewalls forming a plurality of cells, a first cell of the plurality of cells aligned with at least one aperture of the plurality of apertures, the first cell forming and surrounding a cavity adjacent the second face sheet, the first cell including:
    a membrane including a first membrane side and a second membrane side, the first membrane side contacting the inner surface with the first membrane side located contiguous with the at least one aperture;
    a bulk absorber including a first absorber side and a second absorber side, the first absorber side contacting the second membrane side, the bulk absorber further defining the cavity between the second absorber side and the second face sheet.

12. The gas turbine engine of claim 11, wherein the bulk absorber is an open cell foam.

13. The gas turbine engine of claim 12, wherein the membrane is adhered to a surface of the bulk absorber.

14. The gas turbine engine of claim 12, wherein the bulk absorber comprises a first portion having a first porosity and a second portion having a second porosity, greater than the first porosity.

15. The gas turbine engine of claim 14, wherein the first portion is proximate the first face sheet and the second portion is proximate the second face sheet.

16. An acoustic liner comprising:
    a first face sheet including an inner surface, an outer surface opposite the inner surface, and a plurality of apertures, the plurality of apertures extending through the first face sheet from the outer surface to the inner surface;
    a second face sheet spaced from the first face sheet; and
    a plurality of sidewalls mounted between the first face sheet and the second face sheet, the plurality of sidewalls defining a plurality of cells, a first cell of the plurality of cells aligned with at least one aperture of the plurality of apertures, the first cell including:

a membrane surrounded by sidewalls of the plurality of sidewalls which define the first cell, the membrane including a first membrane side and a second membrane side, the first membrane side contacting the inner surface with the first membrane side located contiguous with the at least one aperture;

a bulk absorber including a first absorber side and a second absorber side, the first absorber side contacting the second membrane side.

17. The acoustic liner of claim 16, wherein the membrane includes one or both of a hydrophobic material and an oleophobic material.

18. The acoustic liner of claim 16, wherein the membrane has a thickness between 10 microns and 500 microns.

19. The acoustic liner of claim 16, wherein the membrane is a microporous membrane.

20. The acoustic liner of claim 16, wherein the membrane includes one or both of an oleophobic and a hydrophobic coating.

* * * * *